July 27, 1937.  T. B. FUNK  2,088,293
LAWN MOWER
Filed May 31, 1933    2 Sheets-Sheet 1

Inventor
Truman B. Funk
by *Truman B. Beaman*
Attorney

July 27, 1937.  T. B. FUNK  2,088,293
LAWN MOWER
Filed May 31, 1933   2 Sheets-Sheet 2

Inventor
Truman B. Funk
by
Attorney

Patented July 27, 1937

2,088,293

UNITED STATES PATENT OFFICE 2,088,293

LAWN MOWER

Truman B. Funk, Jackson, Mich., assignor to "Yard-Man" Inc., Jackson, Mich., a corporation of Michigan Application May 31, 1933, Serial No. 673,652

20 Claims. (Cl. 56—249)

The present invention relates to improved lawn mower construction, particularly to the manually propelled type of mower, although the principles of the construction are not so limited and have equal application to mowers of other well known types.

The objects and advantages of the present invention are innumerable and will for the most part be set forth in the detailed description that follows. However, a few of the major objects are as follows:

First, to provide a lawn mower which is substantially silent in operation with the elimination of all gearing.

Secondly, to provide a framework for the cutting reel and knife of sufficient rigidity to obviate the necessity of the cutting reel being rotated in actual wiping contact with the cutting knife.

Thirdly, to improve the effectiveness of the mower upon uneven ground through a three point ground contact.

Fourthly, to regulate the relative position of the traction wheels and the ground or gauge roller with respect to the cutting reel and knife to effect a close conformity between the contour of the ground and that of the cut grass to avoid cutting into the ground or grass roots in passing over uneven ground, for example, in mowing terraces.

Fifthly, to provide a lawn mower which may be economically manufactured in quantity production embodying all the refinements and precision of operation of mowers heretofore marketed at several times the cost; the manufacturing economies for the most part being effected through an extensive use of stamped metal parts and the designing of component parts which may be produced and assembled without being held within costly limits of dimension.

In carrying out the above innumerated objects, stamped sheet metal side frames are rigidly spaced by spacer members in the form of a relatively heavy casted cutter bar and a tubular transverse rod located adjacent the cutting reel with the shaft thereof extending through the side frames and supported in bearings located in the side frames and inwardly from the ends of the shaft. The ends of the cutting reel shaft extending beyond the side frame carry belt pulleys which are preferably self aligning upon the shaft. At the forward end of the side frames, ground wheels are rotatably supported upon stub shafts. Each wheel has a peripheral groove for receiving a driving belt passed over the pulley located upon the end of the cutting reel shaft. The cutting reel is mounted rearwardly of the traction wheels and in close proximity to the ground or gauge roller which is of greatly reduced longitudinal extent as compared with standard practice. The roller is carried by the cutter bar and is located as adjacent the cutting knife as the proper diameter of the roller and cutting reel will permit.

As heretofore stated other objects and advantages and details of construction residing in the invention will be set forth in detailed description to follow. The invention is clearly defined in the appended claims.

In the drawings, wherein a preferred form of the invention is disclosed for the purpose of illustration, Fig. 1 is a plan view of the mower construction.

Figure 2:
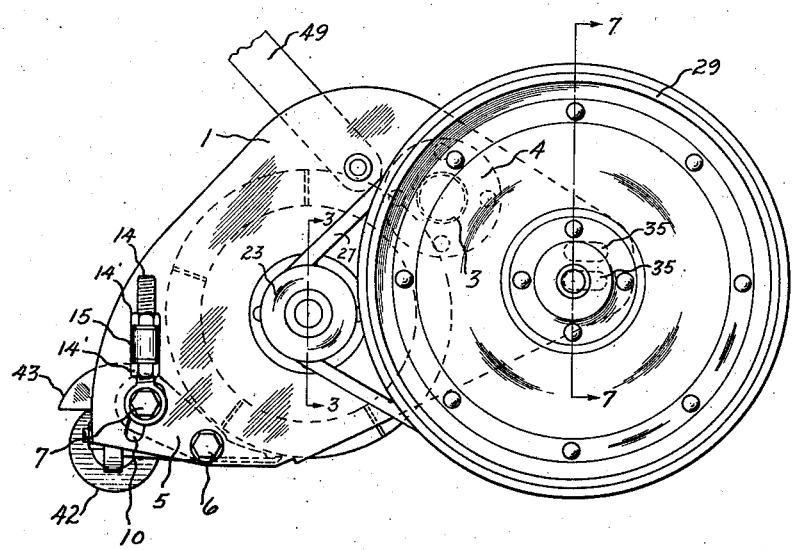
Fig. 2 is a side elevation of Fig. 1.

Having specific reference to the accompanying drawings, side frame members 1, preferably in the form of metal stampings with stiffening flanges 2 are held in rigid spaced relation by spacer members in the form of a tubular rod 3 with flanged ends 4, suitably secured to the side frames 1, and a rigid relatively heavy cast cutter bar 5. The cutter bar 5 is tied into the framework by spaced cap screws 6—7 extending through apertures in the frames 1 and threaded into the cutter bar as at 8—9. As shown in Fig. 2, the aperture 10 through which the screw 7 passes is elongated to permit the cutter bar to be rocked about the screws 6 as a pivot to adjust the cutting knife 11 carried by the cutter bar 3 relative to the cutting reel 12. The cutter bar is rocked by the adjustment of the collars 13 through which the screws 7 are passed. Each collar has an elongated thread portion 14 which is received in a swiveled sleeve 15 supported from the side frames 1. Locking and adjusting nuts 14' are threaded on the members 14 and spaced by the sleeves 15. To effect adjustment of the bar, the screws 6—7 are slightly loosened and the nuts 14' manipulated to rock the bar about the screws 6. The screws 6—7 are then tightened to rigidly clamp the side frames 1 to the cutter bar 5. With this type of adjustment the cutter bar may be moved relative to the cutting reel without sacrifice of the rigidity of construction which would be obtained by a member integral or permanently attached to the side frames 1. It is also to be observed that the clamping of the cutter bar to the side frames 1 at spaced points, namely, at the location of the screws 6—7, also tends to stiffen the construction and to prevent racking or sagging of the framework. In some cases it may be convenient to adjust the cutter bar through the manipulation of the nuts 14' without loosening the cap screws 6—7.

Figures 3, 4:
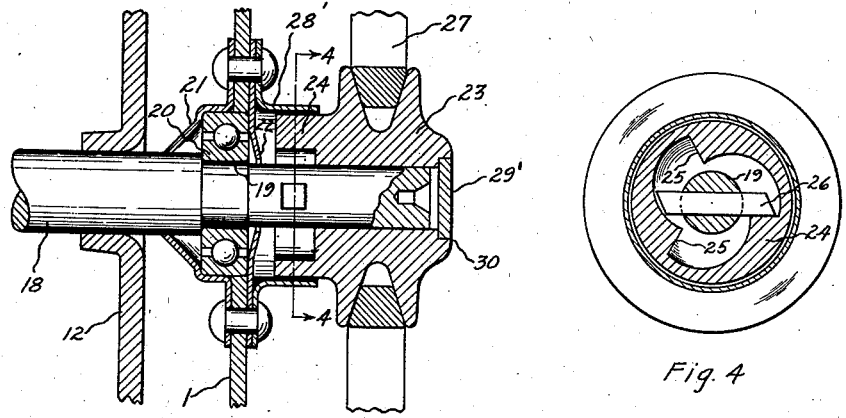
Fig. 3 is a cross sectional view of the cutting reel bearing and pulley taken on line 3—3 of Fig. 2.
Fig. 4 is a cross sectional view of the clutch mechanism taken on line 4—4 of Fig. 3.

The cutting reel 12 consists of the usual blade 16 supported and aligned through spiders 17 located upon the shaft 18. As shown in Fig. 3, the ends of the shaft 18 are journaled at 19 in antifriction bearings 20 positioned in the side frames 1. Housings 21 concentric with the shaft 18 are suitably secured to the frames 1 to provide adequate support for the bearings 20 and to dustproof the same. Plates 22 are likewise employed upon the outside of the side frames 1 to further dustproof the bearings 20 and to retain the same in position. The shaft 18 and reel 12 are driven in one direction through pulleys 23 provided with shank portions 24 having clutching members in the form of pawl and ratchet mechanisms which may conveniently comprise internal ratchet teeth 25 located in the shanks 24 and a pawl 26 slidably secured in the shaft 18. This pawl and ratchet mechanism operates in a well known manner and permits the reel to be rotated forward independent of the driving mechanism. The pulleys 23 are preferably axially slidable upon the shaft 18 and are held in self aligning position solely by the V-belts 27. As shown, the inner ends of the pulley shanks 24 are dust proofed by housings 28' while the outer ends of the pulleys are preferably dustproofed by caps 29' press fitted or expanded in recesses 30. It is to be observed that component parts 21—22—28' are all secured as a unit by the same means to the side frames 1 which greatly facilitate the assembly of the construction. Furthermore by having the pulleys 23 self aligning and slidable upon the shaft 18, the manufactured parts need not be held to strict limits and any slight variations are compensated, and at the same time the required parts are reduced to a minimum.

The belts 27, through which the pulleys 23 are driven, engage peripheral grooves 28 in the traction wheels 29 rotatably located at the forward portion of the side frames 1. The wheels 29 are preferably fabricated from complementary stamped metal portions 30—31 suitably secured together and mounted upon hubs 32 journaled in antifriction bearings 33 upon stub shafts 34 selectively positionable and adjustable along elongated apertures 35 in the side frames (see Fig. 2). The elongated apertures 35 are two in number, one being over the other for the purpose of providing an adjustment of the shearing edge of the cutter bar with respect to the ground. In order to tighten or loosen the belts 27, the nuts 36 are loosened and the wheels 29 moved along the apertures 35. It is to be observed that the dust caps 37 are riveted to the ends of the shafts 34 at 38 and that the dust caps 39 are properly spaced and held in position by shoulders 40 upon the stub shafts 34. This construction likewise results in a reduction of parts over standard practice and facilitates assembling and servicing.

As shown, a resilient tread 41, for example, of rubber is vulcanized to the rim of the wheels 29 to increase the traction of the wheels and to eliminate noise in passing the mower over sidewalks and like surfaces.

The employment of belts for driving the cutting reel from the traction and driving wheels constitutes an essential feature of the present invention. Heretofore attempts have been made to eliminate gearing and at the same time obtain an easy running high speed cutting reel. The patent to Rich, No. 1,496,128, granted June 3, 1924, pertains to this type of construction. However, such constructions have not met with commercial success for the reason that with sprockets and chain the accumulation of cut grass and dirt interrupts the proper cooperativeness between the chain and the sprockets with detrimental results to the mower and its performance. By the use of a belt, preferably a V-belt, the mentioned difficulties are entirely overcome. The belt being of solid construction prevents any great amount of grass and dirt from accumulating in the grooves 28 of the traction and driving wheels. At the same time, such accumulation will only result in the tightening of the belts 27 which has only the effect of improving the driving of the cutting reel. When a V-belt is used the wiping action upon the sheaves has self cleaning properties. In addition, the pulleys 23 are preferably spaced but slightly from the periphery of the wheels 29 as shown in Fig. 2. This reduces the length of belting required and at the same time the pulleys are shielded by the wheels 29 and the possibility of shrubs and tall grass being caught in the belts and passed around the pulleys or traction wheels is greatly minimized. If the sprocket wheel of the Rich patent was located adjacent the traction wheel, the chain would have but slight periphery contact with the sprocket with the result that the sprocket would be driven for the most part through a wiping action of the link of the chain, in which event excess wear would result. Furthermore, the belts 27 may be flush with the periphery of the wheels 29 when located in the grooves 28 with the result that the belts 27 become a part of the traction surface and the weight of the mower tends to retain the belts in driving engagement with the peripheral grooves in the wheels. Also, the belts are held in sealing relation with the grooves 28 at the point of contact with the ground as a further precaution against the accumulation of foreign matter in the grooves.

Another important feature of the present invention resides in the location and design of the ground or gauge roller 42. In standard practice the ground roller has been extended entirely across the width of the machine and has been located substantially to the rear of the point of cutting. Such construction, especially with the cutting reel located directly between the traction wheels presents several decided disadvantages. For instance, the irregularities of the ground over which the traction wheels pass are transferred substantially undiminished to the shearing plane of the cutting knife and reel with the result that corresponding irregularities take place in the cutting operation. By placing the cutting reel rearwardly of the traction wheels these irregularities are diminished proportional to the ratio of the distance between the traction wheels and ground roller and the shearing plane of the cutting knife and reel and the ground roller. It is thus apparent by locating the ground roller as adjacent as possible to the shearing plane that such irregularities are reduced to a minimum and improved cutting operation results. Also, with the ground roller thus located, the height of the cut grass is more uniform as the point of shearing will more closely follow the ground; running the cutting knife and reel into the ground in passing along terraces or ridges is also obviated. Furthermore, through the employment of a relatively short ground wheel located midpoint between the traction wheels a three point contact with the ground is provided which eliminates sagging of the frame when passing over irregular ground and permits accurate and permanent adjustment of the cutting knife relative to the cutting reel. In actual practice, in mowers constructed as herein disclosed, the cutting knife and reel may be adjusted and satisfactorily operated out of actual metal to metal contact. Another advantage resulting from a short ground roller centrally located manifests itself in the cutting of a rounded bank. With the standard ground roller contact is made with the ground adjacent the up hill traction wheels with the result that the grass is cut longer on the down hill side of the mower. This irregularity in cutting becomes noticeable when the mower is traversed back and forth along the bank. By always contracting the ground with the ground roller centrally of the mower, as when a short ground roller is employed, a more regular cutting is accomplished for obvious reasons.

Another important feature of the invention resulting from the central supporting of the ground roller upon the cutter bar, in the manner to be hereinafter described, resides in the inherent tendency of the weight of the mower and the thrust of the operator upon the ground roller to deflect the cutter bar toward the cutting reel. This tendency to be deflected toward the cutting reel counteracts to a substantial degree the tendency to deflect the cutter bar in the opposite direction during the cutting action, particularly during the cutting of heavy grass. It will be readily understood that the more thrust that is required downwardly and forwardly to operate the mower in cutting heavy grass, greater is the tendency for the grass being cut to deflect the cutter bar away from the cutting reel and correspondingly greater is the tendency for the load directed upon the ground roller to counteract such deflection. As a result, improved cutting operation results with more uniform performance.

Figure 1:
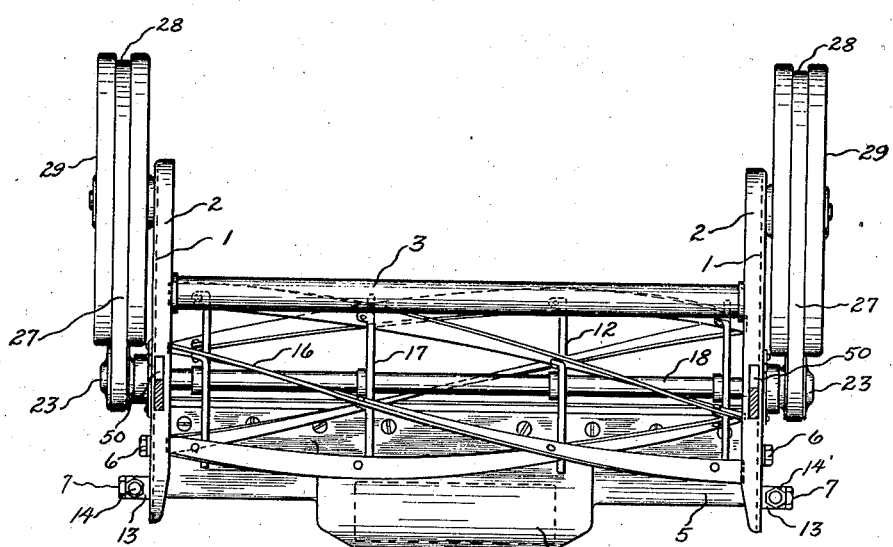
Figure 5:
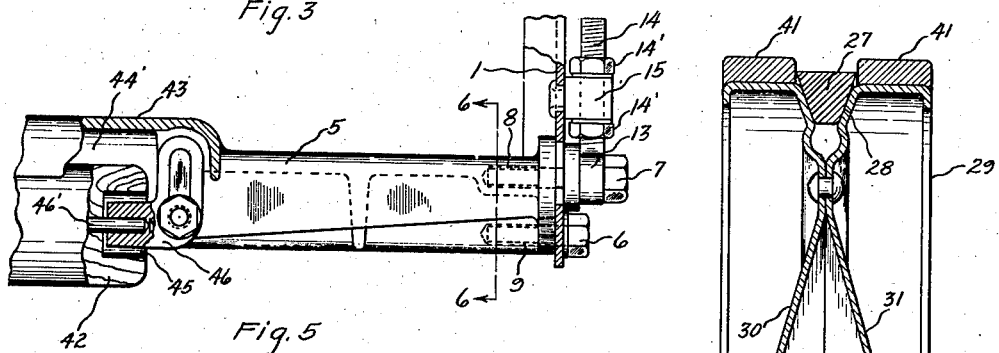
Fig. 5 is a fragmental view of the cutter bar construction taken from the rear of the mower.
Figure 6:
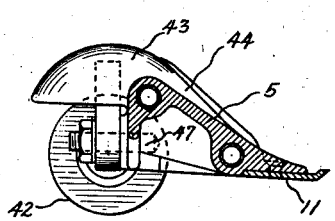
Fig. 6 is a cross sectional view of the cutter bar taken on line 6—6 of Fig. 5.
Figure 7:
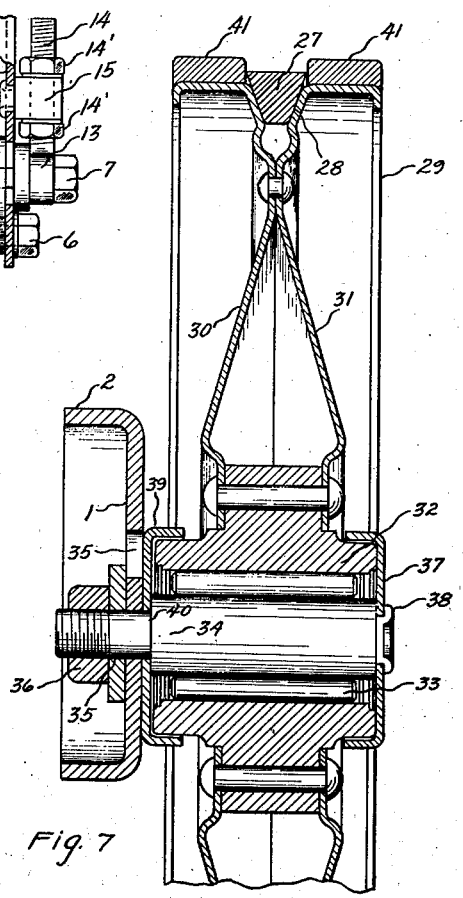
Fig. 7 is a fragmental cross sectional view of the traction wheel taken on line 7—7 of Fig. 2.

As shown in Figs. 1, 5 and 6, the ground or gauge roller 42 is housed by an overhanging portion 43 of the cutter bar 5; the portion 43 being slightly crowned to provide clearance for vertical adjustment of the roller 42. As will be apparent from Fig. 6, the overhanging portion 43 is carried beyond the surface of the cutter bar as at 44 thus permitting the roller 42 to be positioned within a recess 44' with the cutter bar substantially closer to the shearing plane of the cutting knife than would be possible if the roller extended entirely across the mower as in standard practice. Any convenient means may be employed for rotatably and adjustably mounting the roller 42. As shown, the roller 42 is recessed as at 45 to receive L-shaped bearings 46 in which a shaft 46' extended through the roller 42 is journaled. The upright portions of the bearings 46 are slotted to receive stud bolts 47. Opposite ends of the roller 42 are adjustable in a vertical plane upon loosening of the nuts 48 to regulate the height of cutting of the mower.

It is to be observed that the gauge roller 42 is adjusted simultaneously with the adjustment of the cutter bar through the manipulation of the nuts 14'. Also an additional adjustment of the cutting height is made possible through the selective positioning of the stub shafts 34 in the vertically spaced slots 35.

As shown, the sheaves for the belts 27 are in the form of the traction wheels 29. Although the sheaves are preferably constituted from a peripheral groove centrally located in the rim of the wheels 29, it is within the scope of my invention to have the sheaves located to one side of the web of the wheel or other than centrally of the rim.

The usual handle members 49 may be attached to the mower frame in any suitable manner. Preferably slots 50 are provided in the flanges 2 through which the forked arms are passed to be swiveled to the side frames 1.

From the foregoing description it should be apparent to those skilled in the art that I have provided an improved mower substantially silent in its operation and capable of more efficient cutting operation under the usual ground conditions than has been heretofore possible. At the same time, my mower may be inexpensively fabricated and is especially adapted to quantity production.

I have shown a single practical and efficient embodiment of the invention, but I do not desire to be limited to the exact construction and arrangement of parts as shown, and modifications and changes may be made without departing from the scope of the invention as defined by the appended claims.

Having described my invention, what I claim as new and desire to protect by Letters Patent is:

1. In a lawn mower, the combination with a cutter bar carrying a cutting knife, of a ground roller for gauging the cutting height of the mower, said roller being mounted upon said bar intermediate the ends and at substantially the longitudinal axis thereof, whereby the ground roller engages the ground substantially adjacent the cutting plane.

2. In a lawn mower, the combination with a cutter bar carrying a cutting knife, of a ground roller for determining the cutting height of the mower, said roller being directly mounted on said bar at spaced points intermediate the ends of said bar.

3. In a lawn mower, the combination with spaced side plates of sheet metal, of a cutting reel shaft, said plates having aligned apertures therein, antifriction bearings supported in said apertures in which portions of said shaft intermediate the ends are journaled, and sheet metal members affixed to opposite sides of said plates for supporting and dustproofing said bearings.

4. In a lawn mower, the combination with spaced side plates, of a cutting reel shaft journaled in said plates with the ends thereof projecting beyond the plates, pulleys supported and freely slidable upon the projecting ends of said shaft, means for maintaining said shaft and pulleys against relative rotation in one direction, driving means for said pulleys, and belts passing over said driving means and pulleys for driving the latter, said pulleys being slidable into alignment upon the ends of said shaft with said driving means by said belts.

5. In a lawn mower, the combination with a cutting reel, of traction wheels supported forward and at opposite ends of said reel, a ground roller supported rearwardly of said reel, said wheels having peripheral grooves, pulleys carried by said reel in alignment with said grooves, said pulleys being of less width than the tread of said wheels and slightly spaced therefrom whereby the same are shielded thereby, and driving belts running in said grooves and passing over said pulleys.

6. In a lawn mower, the combination with a cutter bar supported on side frames, of spaced wheels, a cutting reel coacting with said bar, a ground roller, said wheels and roller supporting the mower upon the ground, said roller being supported on said cutter bar.

7. In a lawn mower, the combination with a cutter bar, supported on side frames, of spaced wheels, a cutting reel coacting with said bar, a ground roller, said wheels and roller supporting the mower upon the ground, said roller being longitudinally centrally supported upon said cutter bar.

8. In a lawn mower, the combination with a cutter bar, supported on side frames, of spaced wheels, a cutting reel coacting with said bar, a ground roller, said wheels and roller supporting the mower upon the ground, said roller being longitudinally centrally supported upon said cutter bar and of less length than said cutter bar.

9. In a lawn mower, the combination with a cutter bar supported at both ends in the mower, of a cutting reel coacting with said bar, a ground roller for supporting part of said mower upon the ground through said bar, said roller being carried by said bar and under the weight of the mower acting to deflect said bar intermediate its ends toward said cutting reel.

10. In a lawn mower, the combination with a cutting reel shaft, of driven means geared to and freely slidable on the end of the shaft, and driving means supported relatively to said driven means coacting with said driven means, said driven means being aligned axially of said shaft by said driving means.

11. In a lawn mower, the combination with a framework, of a cutting reel shaft supported in said framework, a cutting reel mounted on said shaft, traction wheels mounted in said framework having their axes spaced from that of said reel, said wheels having V-shaped peripheral grooves defined in the rim thereof, pulleys having V-shaped grooves defined in the rims thereof located upon said shaft, and solid V-shape belts running in said grooves and passing over said pulleys, said belts sealing said grooves about the major portion of the circumference of said wheels.

12. A lawn mower comprising a frame, traction wheels mounted in said frame, a cutting reel shaft mounted in said frame rearwardly of said traction wheels, a cutting reel on said shaft, a pulley mounted on each end of said shaft and in alignment with said wheels, a peripheral groove in the surface of each wheel, a driving belt located in each of said grooves and passing around the pulley aligned therewith to drive said cutting reel, a cutter bar supported in said frame beneath and rearwardly of said reel, a ground roller supported by said cutter bar, said roller being substantially less in width than said cutter bar.

13. In a lawn mower the combination of side plates, a bearing in each of said side plates, a cutting reel shaft projecting through said bearings, pulleys having V-shaped grooves defined in the rims thereof located upon the projecting ends of said shaft, traction wheels having peripheral grooves mounted from said plates forward of said shaft, said grooves being in alignment with said pulleys, belts running in said grooves and passing over said pulleys, said pulleys being closely adjacent to the peripheries of said wheels and shielded thereby.

14. In a lawn mower, the combination of sheet metal side plates, a bearing located in each of said side plates, a cutting reel shaft projecting through said bearings, pulleys having V-shaped grooves defined in the rims thereof located on the projecting ends of said shafts, traction wheels mounted on said plates forward of said shaft, said wheels having grooves in the peripheries thereof in alignment with said pulleys and belts running in said grooves and passing over said pulleys.

15. In a lawn mower, the combination of side plates, a bearing located in each plate, a cutting reel shaft projected through said bearings, pulleys having V-shaped grooves defined in the rims thereof mounted on the projecting ends of said shaft, said pulleys being slidable axially of said shaft, means locking said pulleys and said shaft against relative rotation in at least one direction, traction wheels mounted on said plates forward of said shaft, said wheels having sheaves defined in the peripheries thereof, and belts running in said sheaves and passing over said pulleys, said pulleys being aligned axially of said belts.

16. In a lawn mower, the combination with a cutter bar, of a cutting reel coacting with said bar and means mounted on said bar for supporting the mower from the ground and for deflecting the bar toward the cutting reel.

17. In a lawn mower, the combination with a cutter bar, of a cutting reel coacting with said bar and means for supporting the mower on the ground through said bar and for deflecting said bar toward said cutting reel.

18. A wheel comprising complementary sheet metal portions forming a web and a rim, said portions being in contact adjacent the rim and diverging to the rim to provide a peripheral groove centrally of the rim, said groove being for the purpose of receiving a belt.

19. In a lawn mower, the combination with a cutter bar and side frames spaced thereby, of traction wheels mounted upon said frames forward of said bar, and a ground roller mounted on said bar intermediate the ends thereof, said bar having a recessed portion and said roller being located in said recessed portion.

20. In a lawn mower, the combination with a cutter bar and side frames spaced thereby, of traction wheels mounted upon said frame forward of said bar, a ground roller mounted upon said bar intermediate the ends thereof, said bar having a recessed portion and said roller being located in said recessed portion, and means for vertically adjusting said roller in said recessed portion.

TRUMAN B. FUNK.